United States Patent [19]

Schiel

[11] Patent Number: 5,487,715
[45] Date of Patent: Jan. 30, 1996

[54] ROLL WITH VIBRATION DAMPER

[75] Inventor: Christian Schiel, Heidenheim, Germany

[73] Assignee: J.M. Voith GmbH, Heidenheim, Germany

[21] Appl. No.: 248,867

[22] Filed: May 24, 1994

[30] Foreign Application Priority Data

May 29, 1993 [DE] Germany .................. 43 18 035.3

[51] Int. Cl.$^6$ ............................................ F16C 13/00
[52] U.S. Cl. ..................... 492/16; 492/7; 162/358.1
[58] Field of Search ................... 162/358.1; 492/7, 492/16, 2

[56] References Cited

U.S. PATENT DOCUMENTS

| | | | |
|---|---|---|---|
| 3,196,520 | 7/1965 | Appenzeller | 162/358.1 |
| 3,512,475 | 5/1970 | Justus et al. | 100/170 |
| 4,091,517 | 5/1978 | Lehmann et al. | 29/113 |
| 4,328,744 | 5/1982 | Pav et al. | 100/162 B |
| 4,514,887 | 5/1985 | Rauf et al. | 29/116 |
| 4,553,296 | 11/1985 | Eibe | 29/113 R |
| 4,598,448 | 7/1986 | Schiel et al. | 29/116 |
| 4,805,279 | 2/1989 | Pav | 492/2 |
| 4,848,119 | 7/1989 | Pav et al. | 492/2 |
| 5,081,759 | 1/1992 | Schiel | 29/116.1 |
| 5,338,279 | 8/1994 | Schiel | 492/7 |

Primary Examiner—Timothy V. Eley
Assistant Examiner—Marc W. Butler
Attorney, Agent, or Firm—Marshall, O'Toole, Gerstein, Murray & Borun

[57] ABSTRACT

A roll for the preparation or treatment of fiber webs includes a fixed central axis, a roll shell adapted to rotate around the fixed axis and a first chamber disposed between the central axis and the rotatable roll shell. The first chamber is filled with liquid which can transfer a hydraulic supporting force from the central axis to the roll shell. The roll includes a second chamber that is partially filled with air and partially filled with a liquid. Several narrow capillary lines connect the first and second chambers. The capillary characteristic (K) of the capillary lines ranges between about $2.5 \times 10^7$ m$^{-2}$ and about $2.5 \times 10^8$ m$^2$.

10 Claims, 3 Drawing Sheets

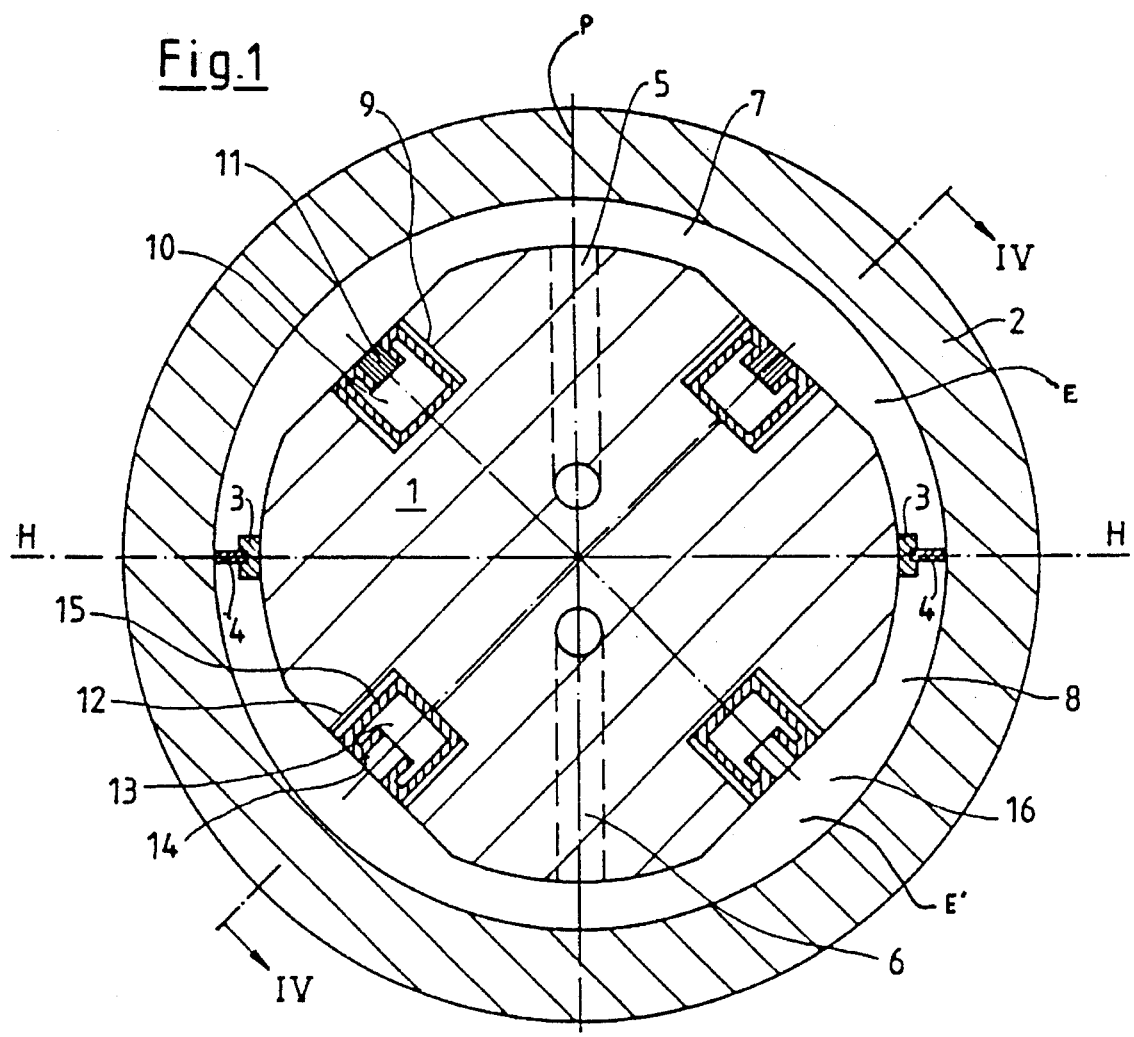

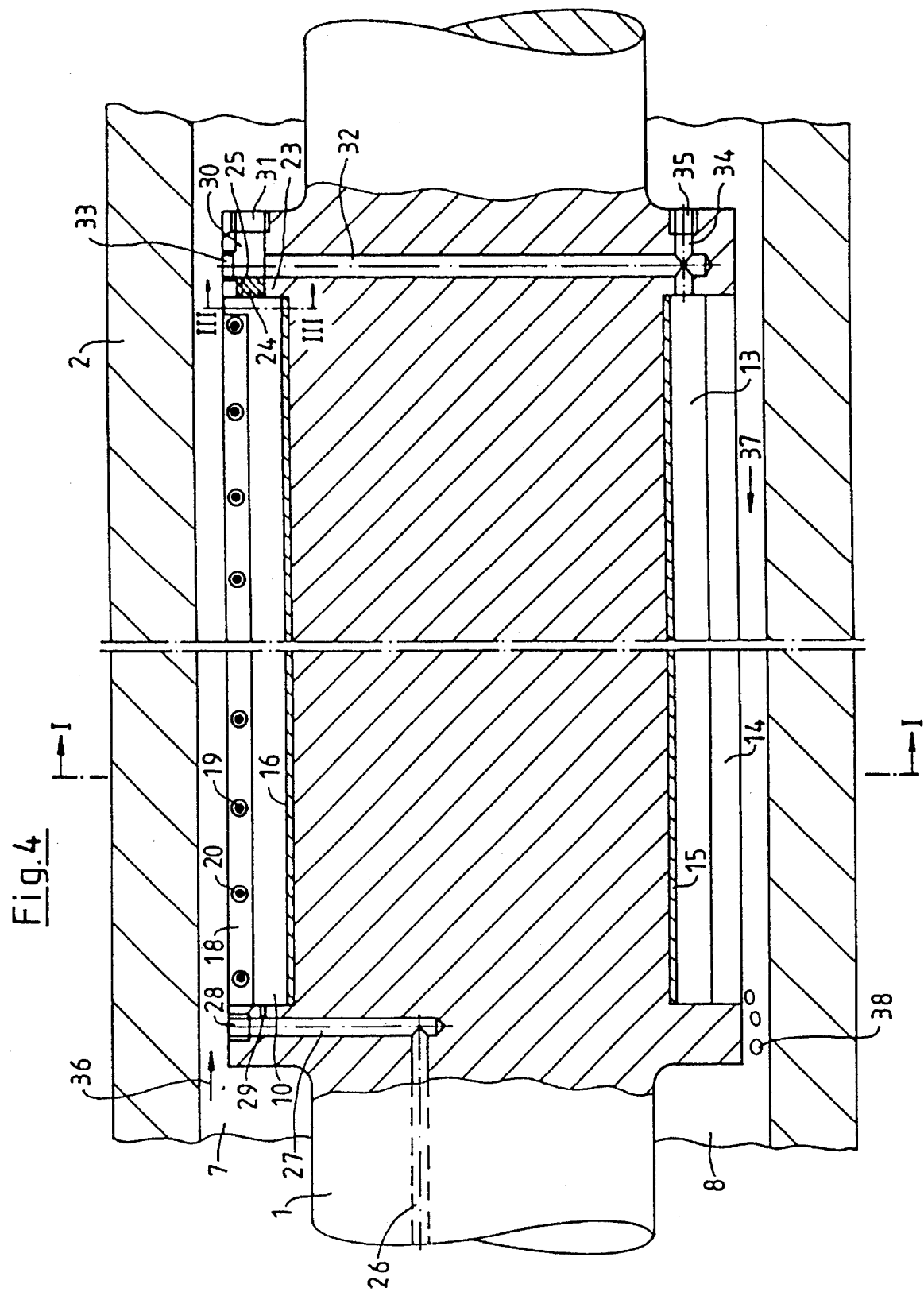

ROLL WITH VIBRATION DAMPER

BACKGROUND OF THE INVENTION

2. Field of the Invention

The invention relates to devices for treating fiber webs and in particular to vibration-damped rolls for producing and treating paper webs.

2. Description of Related Technology

A roll for the production or treatment of fiber webs such as paper webs is known from DE 36 38 070 (corresponding to Schiel, U.S. Pat. No. 5,081,759 issued Jan. 21, 1992). Such a roll has a fixed central axis and a roll shell which rotates around the central axis. The central axis has liquid and gas-filled chambers which cooperate with each other and provide vibration damping for the entire roll.

Although the teachings disclosed in DE 36 38 070 provide means for damping vibrations, the configurations of the roll damping members described therein are complicated and, as a result, cost-intensive. Furthermore, the roll disclosed in DE 36 38 070 in some circumstances does not sufficiently provide vibration damping.

For example, it has been found that providing both chambers of the roll with damping members as shown in FIGS. 1–3 of DE 36 38 070 may be undesirable. Also, the position of the damping members in chambers 7 and 8 as shown in these figures does not provide optimum damping because certain capillary characteristics must be at least approximately maintained.

SUMMARY OF THE INVENTION

It is an object of the invention to overcome one or more of the problems described above. It is also an object of the invention to provide a vibration-damped roll which provides a significantly higher damping action while simultaneously lowering production costs and achieving greater operational safety.

According to the invention, a roll for the production or treatment of fiber webs includes a fixed central axis, a roll shell adapted to rotate around the fixed axis, and a first chamber disposed between the central axis and the rotatable roll shell. The first chamber is filled with liquid which can transfer a hydraulic supporting force from the central axis to the roll shell. The roll includes a second chamber that is partially filled with air and partially filled with a liquid. Several narrow capillary lines connect the first and second chambers. The capillary characteristic (K) of the capillary lines ranges between about $2.5 \times 10^7$ m$^{-2}$ and about $2.5 \times 10^8$ m$^{-2}$.

Other objects and advantages of the invention will be apparent to those skilled in the art from the following detailed description taken in conjunction with the drawings and the appended claims.

BRIEF DESCRIPTION OF THE DRAWINGS

FIG. 1 is a cross-sectional view of a roll according to the invention (taken along line I—I of FIG. 4).

FIGS. 2b–2e illustrate the roll portion of

FIG. 2a at various angles of orientation.

FIG. 4 is a longitudinal-sectional view taken along line IV—IV of FIG. 1.

DETAILED DESCRIPTION OF THE INVENTION

Figure 2A:
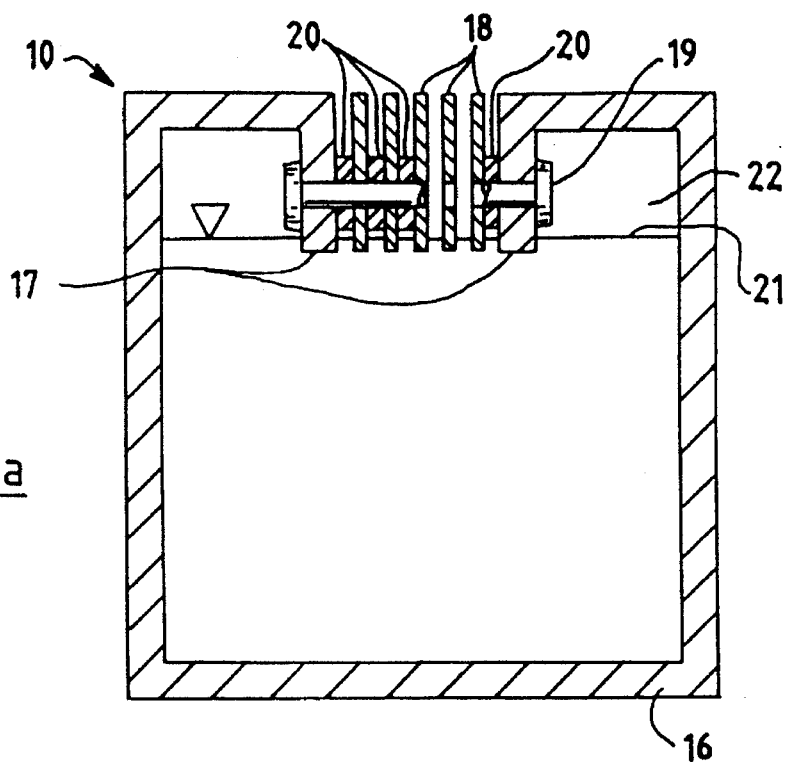
FIG. 2a is a partial and enlarged view of a portion of the roll of FIG. 1.

With reference to FIG. 1, a roll according to the invention includes a hollow cylindrical roll shell 2 rotatably disposed about a central axis 1. The central axis 1 is defined herein as a fixed central structure (i.e. shaft) about which the roll shell 2 rotates. At a horizontal plane H—H, sealing strip holders 3 are fixed to the central axis 1 and elastic sealing strips 4 are held between and press against the holders 3 and the roll shell 2. These sealing strips 4 divide the space between the central axis 1 and the roll shell 2 into a liquid-filled half-annular pressure chamber 7 and a half-annular back-flow chamber 8. Liquid can be moved into or out of the half-annular pressure chamber 7 and half-annular back-flow chamber 8 via inlet channels 5 and discharge channels 6, respectively. Two damping chambers 10 are disposed in two longitudinal slits or grooves 9 in the central axis 1. The damping chambers 10 are each connected to the half-annular pressure chamber 7 by a capillary section 11 comprising a plurality of narrow capillary lines and disposed at an extended region E of the half-annular pressure chamber 7. In the region E, the distance between the central axis 1 and the roll shell 2 is preferably greater than 15 mm during operation of the roll.

In the region of the half-annular back-flow chamber 8, the central axis also has two longitudinal slits or grooves 12 with decoupling chambers 13 disposed therein. Each decoupling chamber 13 is connected with the half-annular back-flow chamber 8 via a connecting piece 14 at an extended region E'. The decoupling chambers 13 can simply be defined by the slits or grooves 12 or, as shown in FIG. 1, by tubular or box-shaped hollow bodies 15 disposed in the grooves 12.

FIG. 2A shows a damping chamber 10 defined by a rectangular tube 16 having a capillary bundle extending thereinto. The capillary bundle comprises two boundary walls 17 and band-shaped lamellae 18 arranged therebetween. The boundary walls 17 extend into (i.e. penetrate) a middle portion of the damping chamber 10 formed by the tube walls 16. The lamellae 18 are secured between the boundary walls 17 by screws or rivets 19 with spacers 20. During operation, the clamping chamber 10 is filled with liquid up to a level indicated by a small triangle 21 in FIG. 2a. Air trapped above the liquid, shown by a gas bubble 22, elastically compensates for volume changes in the combined system of the half-annular pressure chamber 7 and the damping chamber 10 caused by vertical relative movements between the central axis 1 and the roll shell 2 during vibrations of the roll shell 2. The flow of liquid in the slits or gaps between the lamellae 18 that occur during volume changes mentioned above cause the desired damping.

FIGS. 2a–2e demonstrate that, in an embodiment of the invention in which the boundary walls 17 penetrate into the damping chamber 10, a gas bubble 22 is formed in the damping chamber 10 at all angular positions of the damping chamber 10.

Figure 3:
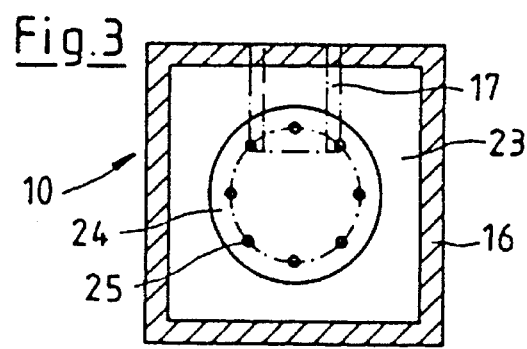
FIG. 3 is an enlarged and partial sectional view of the roll shown in FIG. 1 taken along line III—III of FIG. 4.
Figure 2E:
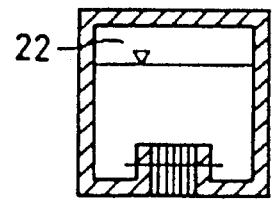
Figure 2B:
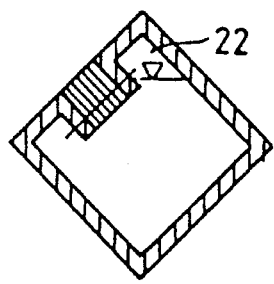
Figure 2C:
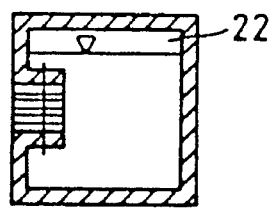
Figure 2D:
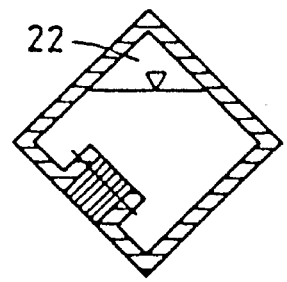

FIG. 3 shows an end portion of the damping chamber 10 with the boundary wall 17 indicated in phantom as it is in front of the plane of reference of the figure. A stopper 24 is disposed in a front face 23 of the damping chamber 10 having a crown of bores 25 through which liquid and air can flow in limited amounts from the damping chamber 10 into a low pressure space. The uppermost bore 25 determines the liquid level in the damping chamber 10 provided that a small amount of air is continuously injected into the damping chamber 10.

FIG. 4 shows a longitudinal sectional view of the central axis 1 surrounded by the roll shell 2. Pressurized fluid flows through the half-annular pressure chamber 7 in a direction indicated by an arrow 36. In the half-annular back-flow chamber 8, the fluid flows in a reverse direction indicated by an arrow 37 and is decompressed. In a lower portion of FIG. 4, one of the decoupling (i.e. equalizing) chambers 13 disposed in the central axis 1 is illustrated. The decoupling chamber 13 communicates with the half-annular back-flow chamber 8 via the connections 14. The damping chamber 10 and the decoupling chamber 13 are connected via a connecting line 32. In order to provide for such connections, in conducting pieces 30 and 34, as well as stoppers 31, 33, and 35 are shown.

Also with reference to FIG. 4, air is injected into the damping chamber 10 through connected bore sections 26, 27, and 29. A stopper 28 is attached to the section 29. The air forms the longitudinal bubble in the damping chamber 10 shown in FIGS. 2a–2e. At the other end of the damping chamber 10 the air leaves through the bores 25 in the stopper 24 and flows through connecting lines 30, 32, and 34 and then into the decoupling chamber 13. The decoupling chamber 13 is filled with air until the air overflows at 38 and leaves the half-annular back-flow chamber 8 with back-flow oil. In order to more clearly show the invention in FIG. 4, the usual frontal seals which seal the half-annular pressure chamber 7 on both ends are not shown. They are insignificant for the mode of operation of the vibration damper. The central axis and the roll shell can be positioned sideways as shown, for example, in FIG. 1 of DE 36 38 070.

The following points A–J have been found relevant to an optimum design of a vibration-damped roll according to the invention:

A. The selection of the dimensions of the capillary section 11 between a first chamber (e.g., the half-annular pressure chamber 7) and a second chamber (e.g., the damping chamber 10) is based upon a capillary characteristic K which ranges between about $2.5 \times 10^7$ m$^{-2}$ and about $2.5 \times 10^8$ m$^{-2}$. This capillary characteristic value has been found desirable for a wide range of roll structural variables, such as:

| | |
|---|---|
| viscosity of the liquid | 30–150 mm²/sec |
| diameter of the central axis | 300–900 mm |
| diameter of the roll | 450–1200 mm |
| peripheral velocity | 300–1800 m/min |
| roll length | 3000–11,000 mm |

Significant damping can be sensed even outside of the above-stated dimensions. However, it is surprising that with the same sizing of the capillary section, such a wide range of structural variables can be covered. As stated previously herein, the dimensions of the capillary section are derived with the aid of a capillary characteristic K, which must lie between about $2.5 \times 10^7$ m$^{-2}$ and about $2.5 \times 10^8$ m$^{-2}$, and is preferably about $8 \times 10^7$ m$^{-2}$.

The capillary characteristic K may be obtained using the following equations.

For capillaries of the small tube type:

$$K = \frac{32 \cdot L}{A \cdot d^2} \cong 8 \cdot 10^7 / \text{m}^2$$

and for parallel-wall gap capillaries:

$$K = \frac{32 \cdot L}{A \cdot s^2} \cong 8 \cdot 10^7 / \text{m}^2$$

wherein
- L=length of the capillary section [m]
- A=sum of all capillary cross-sectional areas per 1 m roll length [m²/m]
- d=diameter of round capillaries [m]
- s=gap width of gap capillaries [m].

In order to reach a desirable capillary characteristic, the dimensions L, A, s, and d must optimally cooperate with one another. Combinations of different capillary sections disposed next to one another and/or behind one another are also possible. The important consideration is that in the sum, or in the cross-section over the roll width, they result in an appropriate capillary characteristic in the range given above.

B. Because the flow velocity is high in a capillary cross-section, the acceleration and deceleration of the liquid flowing therethrough is high. If the capillary section has a length L which is too high, rigid coupling will occur between the central axis mass and the shell mass. For this reason, the length L of the capillary section is kept small, preferably below about 30 mm.

C. Damping action is ensured even at high vibrational amplitudes by the fact that the cross-sectional area of the flow path in the capillary section 11 is chosen sufficiently large but not too large, so that the technical expenditure does not increase too much. In order to achieve this goal, the flow cross-sectional areas in the capillary section are preferably between about 0.003 m²/m and about 0.02 m²/m (particularly preferred between about 0.005 m²/m and about 0.02 m²/m).

D. An embodiment of the invention in which a plurality of capillary lines connect a first chamber (e.g., half-annular pressure chamber 7) and a second chamber (e.g., damping chamber 10), wherein the capillary lines extend from a periphery of the second chamber toward a middle axis thereof, eliminates some of the disadvantages of the damped press roll shown in FIG. 8 of DE 36 38 070 wherein the damper 11/70 acts only in the shown position, i.e., when the pressure chamber 8 is disposed under the damping chamber 70. If the central axis 1 shown in FIG. 8 is turned 180°, the damper becomes ineffective because the free oil level in the chamber 70 disappears. By an embodiment of the invention in which the damping chamber walls and capillary tubes penetrate into the chamber, it is possible to maintain the presence of a compressible gas bubble in the chamber independently of the orientation of the chamber with respect to the central axis and without the necessity of providing pistons or membranes to separate the gas and liquid.

E. The capillary section may be designed as a choking (i.e. throttle) section between the first (pressure) chamber and the second (damping) chamber. Such a section is composed of several parallel slits formed between band-shaped lamellae. The slits extend over the entire length of the damping chamber and are always interrupted by bars that define the distance between lamellae. The width of the slits (i.e. gap between the lamellae) ranges between 0.25 mm and about 1.0 mm, and is preferably about 0.5 mm.

F. As shown in FIG. 1, there are preferably two damping chambers 10 per half-annular pressure chamber 7, each damping chamber 10 is disposed at an incline of between about 30° and about 60° from a pressing plane P and at either side thereof. Each damping chamber preferably extends along the entire length of the adjacent pressure chamber, which extends along the entire length of the roll. Alternatively, a damping chamber may be longitudinally subdivided into a plurality of chambers. By having at least two damping chambers per pressure chamber disposed approximately in the middle of the quadrants formed between the pressing plane and the longitudinal seal (elements 3 and 4), the flow paths of oil toward the damping chamber are minimized.

G. Similarly, there are preferably two equalizing (or decoupling) chambers cooperating with the half-annular back-flow chamber 8 disposed on the opposite side of the central axis from the half-annular chamber 7. In case the half-annular back-flow chamber 8 is filled with oil, it is advantageous to dispose the two decoupling chambers 13 between 30° and 60° from the pressing plane. However, the connections 14 between the half-annular back-flow chamber 8 and the decoupling chambers 13 should have relatively large cross-sectional areas with a capillary characteristic below about $6 \times 10^6$ $m^{-2}$ and preferably below about $10^{-7}$ $m^{-2}$.

H. In order to achieve an optimum decoupling and damping effect between the central axis and roll shell, it is desirable that the gaps (i.e. radial distance) between the central axis and the roll shell are sufficiently large, preferably greater than 15 mm during operation of the roll shell, particularly in the regions neighboring the damping and decoupling chambers (illustrated by E and E' respectively in FIG. 1).

I. In order to maintain a gas bubble in the damping chamber and optionally also in the decoupling chamber, a small amount of air is preferably introduced into these chambers continuously or intermittently.

J. If the decoupling chambers are constructed without a membrane for the separation of air and oil, air can be introduced into these chambers from the damping chamber via a connecting line therebetween wherein restrictions for controlling the liquid level, such as "level diaphragms," are disposed at the end of the damping chamber.

The foregoing detailed description is given for clearness of understanding only, and no unnecessary limitations should be understood therefrom, as modifications within the scope of the invention will be apparent to those skilled in the art.

I claim:

1. A roll for use in fiber web processing comprising:
   a) a fixed central axis;
   b) a roll shell adapted to rotate about the central axis;
   c) a first chamber disposed between the central axis and the roll shell, said chamber being half-annular in form and filled with a liquid for transferring a hydraulic supporting force from the central axis to the roll shell;
   d) a second chamber partially filled with air and partially filled with liquid; and,
   e) a plurality of narrow capillary lines connecting the first and second chambers, said capillary lines having a capillary characteristic (K) of between about $2.5 \times 10^7$ $m^{-2}$ and about $2.5 \times 10^8$ $m^{-2}$.

2. The roll of claim 1 wherein the capillary lines between the first chamber and the second chamber have a length of less than about 30 mm.

3. The roll of claim 1 wherein the roll has a length and each capillary line of said plurality of capillary lines has a cross-sectional area and the sum of the cross-sectional areas of the plurality of capillary lines per meter of roll length is between about 0.005 $m^2$ and about 0.02 $m^2$.

4. A roll for use in fiber web processing comprising:
   a) a fixed central axis;
   b) a roll shell adapted to rotate about the central axis;
   c) a first chamber disposed between the fixed central axis and the roll shell, said chamber being half-annular in form and filled with liquid for transferring a hydraulic supporting force from the central axis to the roll shell;
   d) at least one second chamber filled partially with air and partially with liquid, said second chamber extending substantially along a length of the roll;
   e) a plurality of narrow capillary lines connecting the first chamber and the second chamber, said capillary lines extending from a periphery of the second chamber toward a middle portion thereof.

5. The roll of claim 4 wherein said capillary lines comprise a plurality of band-shaped lamellae and gaps between the lamellae range between about 0.25 mm and about 1 mm.

6. The roll of claim 4 wherein said at least one second chamber comprises two second chambers disposed in the central axis, each second chamber oriented between about 30° and about 60° from a pressing plane of the roll.

7. The roll of claim 6 comprising a third chamber disposed between the central axis and the roll shell and being half-annular in form, two partially air-filled equalizing chambers each disposed in the central axis about 30° to about 60° from the pressing plane, the third chamber being connected to each of the two equalizing chambers by capillary connections having a capillary characteristic of less than $10^{-7}$ $m^{-2}$.

8. The roll of claim 7 wherein in a region neighboring the two second chambers and the two equalizing chambers, a distance between the central axis and the roll shell is greater than about 15 mm during operation of the roll.

9. The roll of claim 7 wherein each of the two second chambers and optionally each of the two equalization chambers is injected with air during operation of the roll.

10. The roll of claim 9 comprising an air inlet into at least one of the two equalization chambers, said air inlet connected to at least one of the two second chambers, said air inlet including connecting lines with choking points.

* * * * *